United States Patent [19]
Price

[11] 3,805,865
[45] Apr. 23, 1974

[54] TIRE TREAD CONSTRUCTION

[76] Inventor: Willie L. Price, Rt. 2, White Cloud, Mich. 49349

[22] Filed: Oct. 15, 1969

[21] Appl. No.: 866,597

[52] U.S. Cl. .......................................... 152/209 R
[51] Int. Cl. .............................................. B60c 11/10
[58] Field of Search ................................... 152/209

[56] References Cited
UNITED STATES PATENTS
2,891,594  6/1959  Ford ............................ 152/209 R
3,001,518  9/1961  Suominen ....................... 152/209

FOREIGN PATENTS OR APPLICATIONS
557,976  2/1957  Italy ............................... 152/209

Primary Examiner—James B. Marbert
Attorney, Agent, or Firm—Price, Heneveld, Huizenga & Cooper

[57] ABSTRACT

This disclosure relates to a vehicle tire construction having a tread portion with fingertip treads of generally frustro-conical shape extending radially of the carcass and tapering in length from an outer portion to a central circumferential portion of the tire. The central circumferential portion of the tire is recessed to provide improved gripping contact with hard road surfaces, including ice, under abnormal loading of the tire.

8 Claims, 4 Drawing Figures

PATENTED APR 23 1974　　3,805,865

INVENTOR.
WILLIE L. PRICE
BY Price, Heneveld
Huizenga & Cooper
ATTORNEYS

TIRE TREAD CONSTRUCTION

This invention relates to a tire construction for vehicle wheels. In one of its aspects, it relates to a vehicle wheel tire construction in which a plurality of rows of radially extending fingertip treads taper from an outer portion of the carcass to a circumferential central portion.

Many tire constructions have been devised for snow, ice and normal wear. Most recently successful are the so-called snow tires with metal studs imbedded therein. The tires are quite successful on snow and ice but are insuitable on dry pavement due to the abrasive nature of the studs on the road.

Conventional snow tires have radial projections which give good traction in snow and mud. The projections extend into the soft road surface and thereby grip the road. Frequently, however, the spaces between the projections fill with mud and snow, and the tires lose their effectiveness. On hard surfaces such as ice, moreover, the projections do not pierce the outer surface of the ice and have less contact area with the surface than conventional tires. Further, the tire tends to ride on the central portion with the result that the tire slides laterally and does not grip the road. The snow tires in many cases have less traction on the ice than conventional tires.

My invention seeks to overcome these prior art problems by the provision of rows of fingertip treads which taper in length from an outer axial edge of the tire to a central circumferential portion. A recess is provided at the central circumferential portion to provide positive gripping of the road by the fingertip treads.

By various aspects of this invention, one or more of the following, or other, objects can be obtained.

It is an object of this invention to provide an improved vehicle tire which is adapted for snow, mud, ice and dry road conditions.

It is a further object of this invention to provide a snow and ice tire which behaves well on dry roads without abrasive action on the road surface.

It is a further object of this invention to provide a snow tire which minimizes the build-up of snow and mud within the treads.

It is a further object of this invention to provide a snow tire with improved gripping action for icy roads.

It is a further object of this invention to provide an improved vehicle tire wherein the tread construction provides more of a cushioned ride.

It is yet another object of this invention to provide an improved vehicle tire wherein the tread construction circulates air between the treads to decrease heat buildup.

Other aspects, objects, and the several advantages of this invention are apparent to one skilled in the art from a study of this disclosure, the drawings, and the appended claims.

According to the invention there is provided a vehicle wheel tire construction of a hollow, generally cylindrical carcass having tread portions on the outer circumferential edges thereof. The tread portion is formed from a plurality of circumferential rows of fingertip treads extending in a generally radial direction and being generally frustroconically shaped. The rows of finger-tip treads taper in length from the side edges of the carcass towards a central circumferential portion thereof.

Preferably, a recess is formed in the central circumferential area of the carcass.

The invention will now be described with reference to the accompanying drawings in which.

Figure 1:
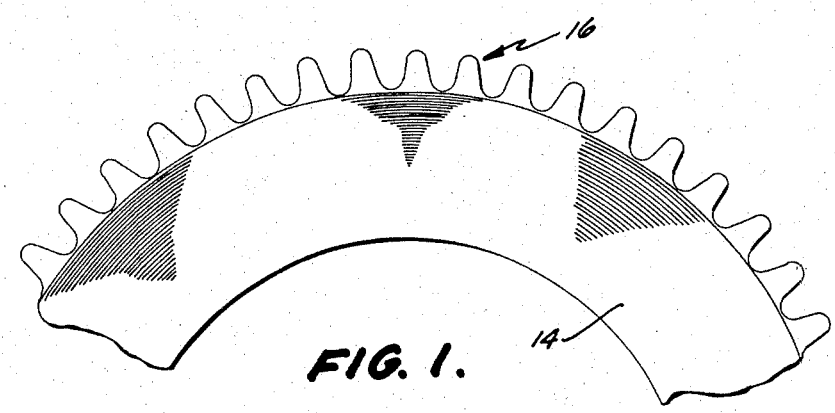
FIG. 1 is a partial side elevational view illustrating the invention.

Referring now to the drawings, there is shown a tire carcass 12 of generally hollow cylindrical shape having side walls 14 and a tread portion 16 at the circumferential edges thereof. The tread portion is formed of circumferential rows 18, 20, 22, 24, 25, 26, 28, 30, 32 and 33 of fingertip treads. These treads are called fingertip treads because of their fingerlike appearance. The fingertip treads are frustroconically shaped and taper radially from a base to a rounded end portion. The axial height of the treads in each row tapers inwardly towards the central circumferential tread portion 34. In other words, the height of the rows 18, 20, 22, 24 and 25 are of decreasing magnitude. The height of rows 26, 28, 30, 32 and 33 are also of decreasing magnitude.

The central circumferential portion 34 is recessed, leaving an opening around the center of the tire.

Figure 2:
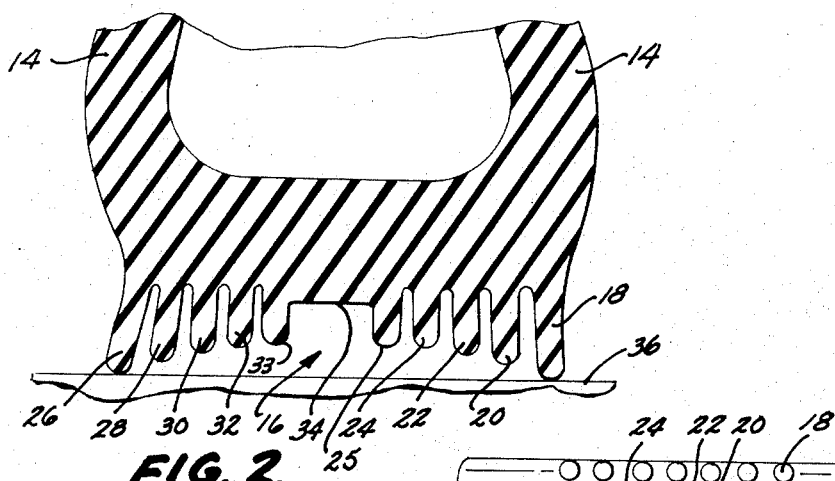
FIG. 2 is a sectional view of the tire in contact with a road surface.
Figure 3:
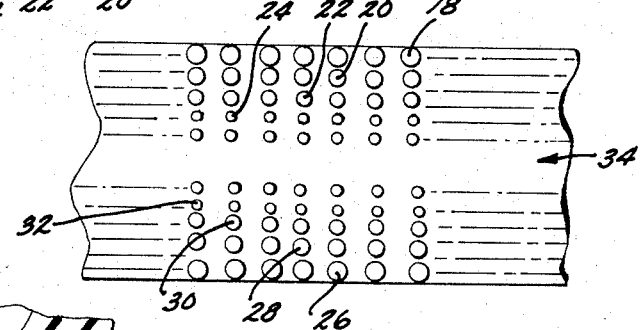
FIG. 3 is a bottom view of the tire.

FIG. 2 illustrates the manner in which the treads will contact a normal road surface 36. On soft roads such as snow and mud, the fingertip treads will sink into the surface thereby gripping the road. Depending on the depth of the snow or mud, the tire will sink into the road up to the height of the central recessed portion 34. When the tire is rotating at fast speeds, the relationship between the tire and the road surface 36 is represented by FIG. 2. In this condition, air will circulate among the treads to cool the tire surface thereby preventing excessive heat buildup on the tire.

Figure 4:
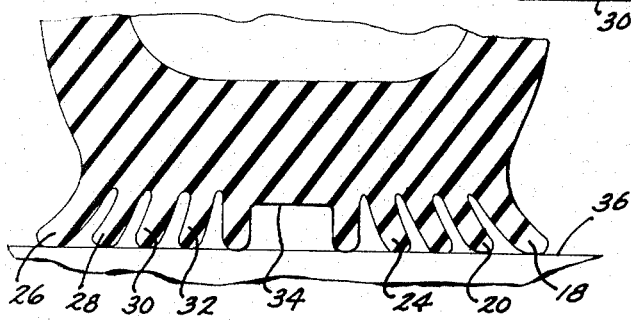
FIG. 4 is a partial sectional view like FIG. 2 illustrating the behavior of the tire under high stress conditions.

The condition between the tire and the road surface 36 under abnormal stress conditions and on icy roads is illustrated by FIG. 4. In this condition, the fingertip treads will spread out somewhat and thereby grip the road. Due to the fact that the central portion 34 is recessed, the fingertip treads will be able to contact minor surface irregularities with increased gripping action. This differs from conventional tires which have a central area on which the tire rides. This central area of conventional tires is responsible for much of the slipping on icy roads.

As an example of a tire construction, for a tire having a 7-inch width, the fingertip tread portions on either side can be approximately 2 ¾ inches and the central portion can be approximately 1 ½ inches. For such a tire, the fingertip treads 18 and 26 can have a base diameter of about one-half inches and be approximately 2 inches long. The diameter of the treads is tapered slightly along the radial height of the treads to a rounded outer portion. The innermost row 25 and 33 of the tire construction can have an axial height of approximately one-half inches. Thus, there will be approximately 1 ½ inch height difference between the top of the outer fingertip treads 18 and 26 and the outer circumferential surface of the central portion 34.

It will be appreciated that when operating at high speeds on hard surface or soft surface roads, the tire will tend to take the configuration illustrated in FIG. 2. The tire tends to ride on an air cushion between the axial circumferential edges of the tire. In so doing, a cushioned ride is given to the vehicle. Yet, if the vehicle must be stopped quickly, higher stress is then placed on the tires, or at least the front wheel tires, so that the condition of FIG. 4 results with maximum contact between the tire and the road surface for maximum friction. In addition, this same condition will result in the rear wheels when the car is accelerating. Therefore the tire gives maximum road contact when needed and still permits gripping of snow or mud covered roads.

The tire construction serves to dislodge snow and mud from between the fingertip portions. Normally, the treads will be bent somewhat when in contact with the road. When contact with the road is broken, the treads will spring back to their normal position. This movement of the treads will tend to dislodge snow and mud to maintain the tires in condition for maximum traction the road.

Reasonable variation and modification are possible within the scope of the foregoing disclosure and drawings without departing from the spirit of the invention.

The embodiments of the invention in which an exclusive property or pivilege is claimed are defined as follows:

1. A vehicle wheel tire construction comprising a hollow, generally cylindrical carcass having a tread portion on the outer circumferential edges thereof, the improvement which comprises:
said tread portion formed from a plurality of circumferential rows of fingertip treads, said fingertip treads extending in a generally radial direction and being generally fingerlike in shape, said fingertip treads of different rows being progressively shorter in length from the outer row of the side edges of said carcass towards the inner rows adjacent the central circumferential plane of said carcass and the extreme ends of the inner rows lying in a locus located above a plane extending thru the extreme ends of the outermost rows.

2. A tire construction according to claim 1 wherein said tread portion further comprises a central recessed portion disposed in a central circumferential area of said carcass.

3. A tire construction according to claim 2 wherein said central recessed portion normally lies in a circumferential plane radially inwardly of said outer ends of said fingertip treads.

4. A tire construction according to claim 1 wherein the radial heighth of said fingertip treads ranges from about one-half inch to about 2 inches.

5. A tire construction according to claim 1 wherein the diameter of said treads at the base thereof is about one-half inches and tapers to a rounded outer tip.

6. A tire construction according to claim 1 wherein said fingertip treads have rounded ends.

7. A tire construction according to claim 1 wherein said fingertip treads taper in height down to a circumferential central portion such that when a substantial force is applied to said tire against a hard surface, said fingertip treads will be deformed outwardly to maintain maximum gripping contact with said flat surface.

8. A vehicle wheel tire construction comprising a hollow, generally cylindrical carcass having a tread portion on the outer circumferential edges thereof, the improvement which comprises: said tread portion formed from a plurality of circumferential rows of flexible fingertip treads, said fingertip treads extending in a generally radial direction and being generally finger-like in shape; and a central recessed portion disposed in a central circumferential area of said carcass, said rows of fingertip treads tapering in length from the side edges of said carcass toward said central recessed portion.

* * * * *